United States Patent
Jimenez et al.

(10) Patent No.: US 10,250,938 B1
(45) Date of Patent: Apr. 2, 2019

(54) PRE-FETCHING SUPPLEMENTAL CONTENT FOR A MEDIA STREAM

(71) Applicant: Verizon Patent and Licensing Inc., Arlington, VA (US)

(72) Inventors: Eduardo Jimenez, Santa Clara, CA (US); Rodrigo Meneses, Santa Clara, CA (US); Mahesh Kumar Vasanthusomashekar, Newark, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/886,601

(22) Filed: Feb. 1, 2018

(51) Int. Cl.
*H04N 21/433* (2011.01)
*H04N 21/458* (2011.01)
*H04N 21/472* (2011.01)
*H04N 21/4722* (2011.01)

(52) U.S. Cl.
CPC ....... *H04N 21/4331* (2013.01); *H04N 21/458* (2013.01); *H04N 21/47214* (2013.01); *H04N 21/4722* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,317,780 | B1 * | 11/2001 | Cohn | G06F 17/30902 707/E17.12 |
| 8,548,848 | B1 * | 10/2013 | Shaw | G06Q 30/00 705/14.1 |
| 2002/0147984 | A1 * | 10/2002 | Tomsen | H04N 5/4401 725/109 |
| 2010/0035589 | A1 * | 2/2010 | Wormald | H04M 1/72561 455/414.1 |
| 2012/0167132 | A1 * | 6/2012 | Mathews | H04N 21/25808 725/32 |
| 2014/0025835 | A1 * | 1/2014 | Gahm | H04N 21/2401 709/231 |
| 2017/0064616 | A1 * | 3/2017 | Park | G06F 9/5072 |
| 2017/0070784 | A1 * | 3/2017 | Massoudi | H04N 21/812 |
| 2017/0316089 | A1 * | 11/2017 | Bucciarelli-Tieger | C22C 21/06 |

* cited by examiner

*Primary Examiner* — Alexander Gee

(57) ABSTRACT

An example described herein may include sending a request to access a media stream from a content delivery network; receiving program content of the media stream from the content delivery network; sending a request, for supplemental content information, to a supplemental content server based on receiving the program content, where the supplemental content information is associated with an upcoming time period of the media stream, and where the request includes information identifying the upcoming time period; obtaining, prior to the upcoming time period, the supplemental content information associated with the media stream for the upcoming time period; and during streaming of the media stream, inserting the supplemental content associated with the supplemental content information in one or more breaks of the media stream during the upcoming time period.

20 Claims, 6 Drawing Sheets

US 10,250,938 B1

PRE-FETCHING SUPPLEMENTAL CONTENT FOR A MEDIA STREAM

BACKGROUND

Streaming media (e.g., video streaming) involves delivering content and continually presenting the content to an end-user. A media stream can include a live stream, a look-up stream, and/or the like. In a live stream, content is provided to a destination device without saving the content (e.g., using memory resources). In a look-up stream, content can be saved and/or buffered (e.g., temporarily stored) in a look-up storage prior to being provided to a destination device.

DETAILED DESCRIPTION OF PREFERRED EMBODIMENTS

Figure 1A:
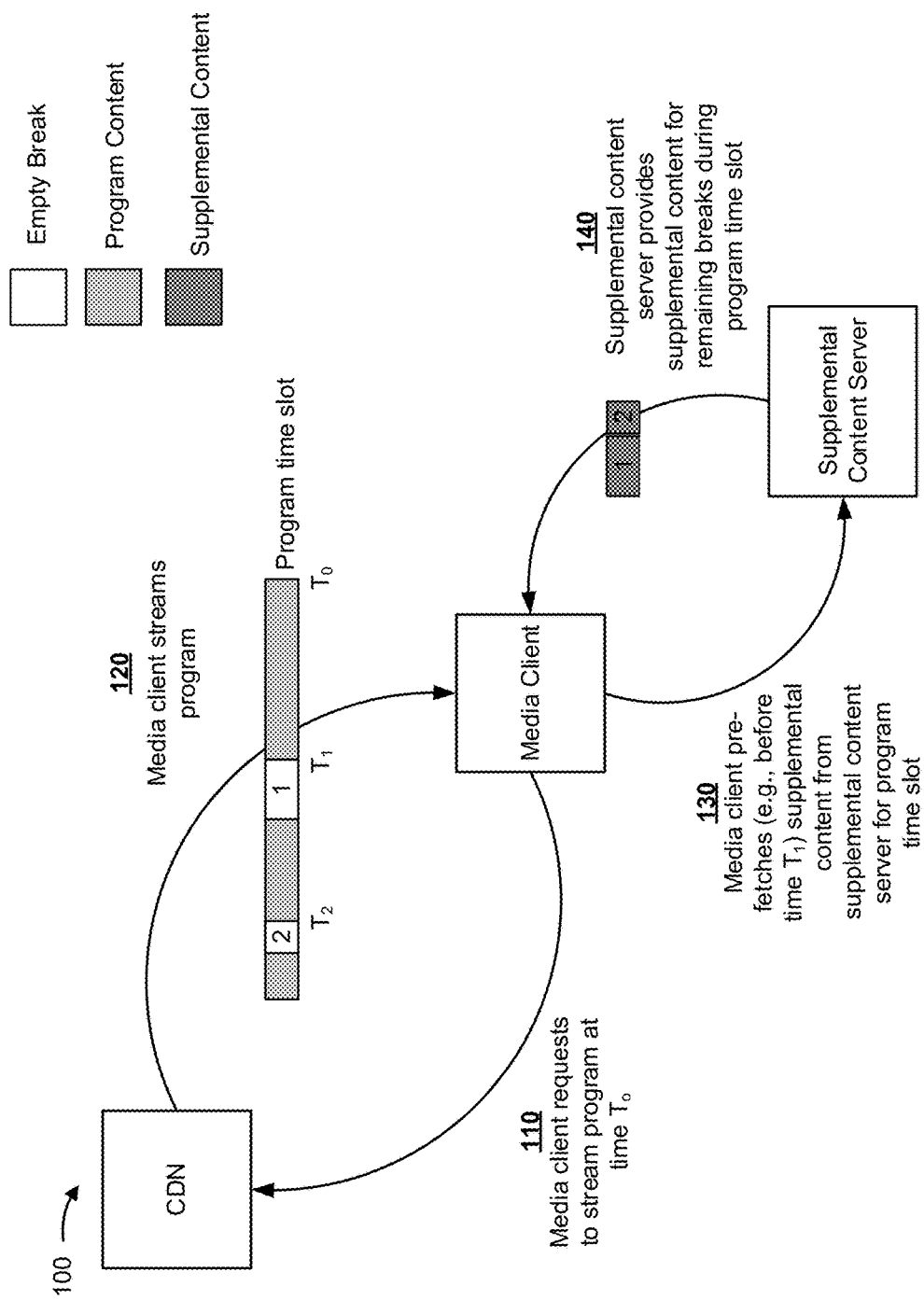
FIGS. 1A and 1B are diagrams of an overview of an example implementation described herein.

The following detailed description of example implementations refers to the accompanying drawings. The same reference numbers in different drawings can identify the same or similar elements.

In many instances, a media client, that is streaming program content via a media stream, requests supplemental content (e.g., metadata, display content associated with the media stream, advertising content (or ad content), and/or the like) when the media client detects that a break (that is to be filled with supplemental content) in the program content is approaching. For example, based on receiving a cueing message of an upcoming break (e.g., a society of cable and telecommunication engineers (SCTE) 35 (SCTE35) message), the media client can request a supplemental content server to provide supplemental content that is to be inserted within the break. The cueing message can be received by thousands or millions of media clients that are streaming the same media stream, at or near the same time. Accordingly, in consideration of multiple media clients streaming a particular media stream, the supplemental content server can receive corresponding thousands or millions of requests for supplemental content at or near a same moment in time. As such, the supplemental content server can be overloaded with requests and, as a result, can be unable to provide the supplemental content. In such cases, the media stream can encounter errors or failures, such as failing to stream any supplemental content, streaming improper supplemental content, and/or the like. In some cases, the media client stop accessing the media stream (e.g., end a streaming session), altogether, if the supplemental content is not received for a break (e.g., due to timeout settings).

According to some implementations described herein, a supplemental content delivery system enables a media client to obtain supplemental content for a particular time period of a media stream before receiving cueing messages of the media stream (e.g., before receiving an SCTE35 message). For example, a media client, accessing a media stream, can request supplemental content for a time slot corresponding to a scheduled time of a program based on accessing the media stream, based on receiving program content (corresponding to the program) of the media stream, based on receiving the media stream for a threshold period of time (e.g., after 5 seconds, 30 seconds, 1 minute, and/or the like), according to a schedule (e.g., a schedule specific to the media client, a random schedule (or randomly generated schedule), and/or the like), and/or the like. In some implementations, the media client can request supplemental content breaks for an upcoming time period once the time period corresponding to a previous request for supplemental content is about to expire (e.g., within 1 minute of expiration, within 30 seconds of expiration, and/or the like). In some implementations, the media client can request the supplemental content for a time period that is based on when the media client began streaming the media stream.

Accordingly, because requests for supplemental content, from different media clients, can be based on characteristics of the media clients, based on timing of streaming the media stream, and/or based on random request factors, the media clients can request supplemental content from a supplemental content server at different times. As such, according to some implementations described herein, requests for supplemental content from many media clients (e.g., requests from thousands or millions of media clients) are not to be transmitted and/or received at a same time (or within a relatively short time period (e.g., within 5 seconds or less)), as done using prior techniques. In other words, some implementations described herein provide for supplemental content to be proactively requested (e.g., once the media stream is being streamed) rather than reactively requested (e.g., once a break in the media stream is detected) as performed in prior techniques. As such, some implementations described herein enable the load on the supplemental content server to be balanced across a longer time period (e.g., over 5 minutes, over 10 minutes, over 20 minutes, over 30 minutes, over an hour, and/or the like) than a previous, relatively short, time period (e.g., less than 5 seconds, less than 10 seconds, less than 20 seconds, and/or the like) that falls just before a break in the media stream as performed in previous techniques. Therefore, some implementations, described herein, can prevent media streaming errors or failures resulting in improper supplemental content streaming, extended buffering (which can be a waste of computing resources), disrupted streaming (e.g., due to a timeout caused by an overload supplemental content server), and/or the like.

Figure 1B:
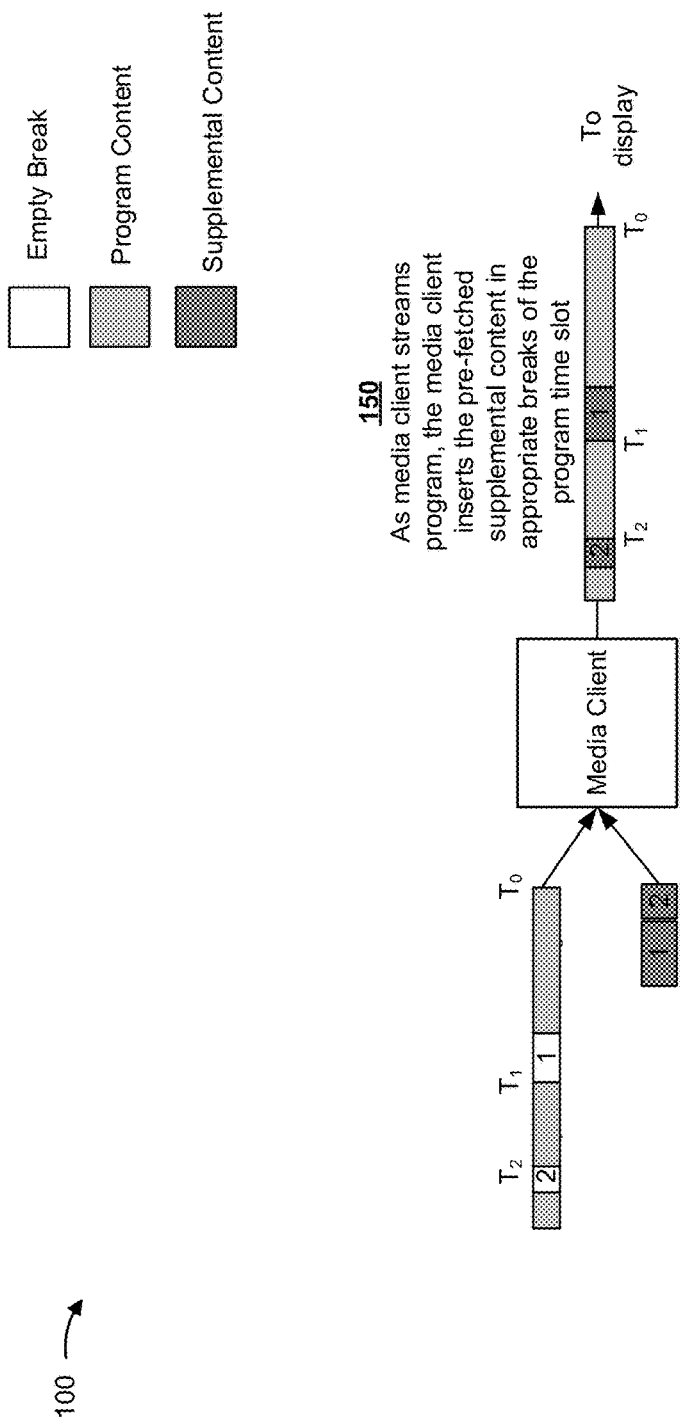

FIGS. 1A and 1B are diagrams of an overview of an example implementation 100 described herein. As shown in FIG. 1A, example implementation 100 includes a media client, a content delivery network (CDN), and a supplemental content server. As shown by reference number 110, the media client requests to stream a program at time $T_0$. For example, the media client can send the request to the CDN. As shown by reference number 120, the media client streams the requested program. For example, the CDN can provide, to the media client, a media stream associated with the requested program. As shown, the media stream can include a program time slot that includes portions of program content, beginning at time $T_0$, and break 1 and break 2 between the portions of content, beginning at time $T_1$ and time $T_2$, respectively.

As further shown in FIG. 1A, and as shown by reference number 130, rather than reactively waiting for a break in the program content, the media client proactively fetches (i.e., pre-fetches) supplemental content from the supplemental content server. For example, the media client requests the supplemental content before time $T_1$, without waiting for break 1 to be detected (e.g., without detecting a cueing message (e.g., an SCTE35 message) for break 1). In some implementations, a time of the request for the supplemental content can be based on characteristics of the media client, based on timing of streaming the media stream, based on a time of a previous request for supplemental content, and/or random factors. For example, the media client can request the supplemental content at a randomly selected time, at a time based on receiving the media stream, at a time based on having received the media stream for a period of time, and/or the like. As shown by reference number 140, the supplemental content server provides supplemental content for the remaining breaks during the program time slot. For example, as shown, the supplemental content server provides supplemental content 1 for break 1, and supplemental content 2 for bread 2. It is noted that supplemental content 1 and/or supplemental content 2 can include supplemental content multiple different sets of supplemental content (e.g., multiple different ads). In some implementations, the media client provides (e.g., in providing the request for the supplemental content) information (e.g., information associated with the program being streamed, information associated with a location of the media client and/or viewer of the program, and/or other information related to the media stream), so that the supplemental content server can identify appropriate supplemental content for the media stream when providing the supplemental content to be inserted into the media stream.

As shown in FIG. 1B, and as shown by reference number 150, as the media client streams the program, the media client inserts the pre-fetched supplemental content in appropriate breaks of the program time slot. For example, the media client inserts supplemental content 1 into break 1 and supplemental content 2 into break 2 in the program time slot. As such, the supplemental content may be appropriately displayed (e.g., via a display of the media client).

Because the request for supplemental content of example implementation 100 can be based on timing of streaming the media stream, and/or random factors, the media client can request supplemental content from a supplemental content server at a relatively different time than many (e.g., thousands or millions of) other media clients, rather than at the same time as the many other media clients. As such, the media client enables the load on the supplemental content server to be balanced across a longer time period than a relatively short time period that falls just before a break in the media stream as performed in previous techniques, thereby preventing media streaming errors or failures resulting in improper supplemental content streaming, dropping the media stream, extended buffering, and/or the like.

As indicated above, FIGS. 1A and 1B are provided merely as an example. Other examples are possible and can differ from what was described with regard to FIGS. 1A and 1B.

Figure 2:
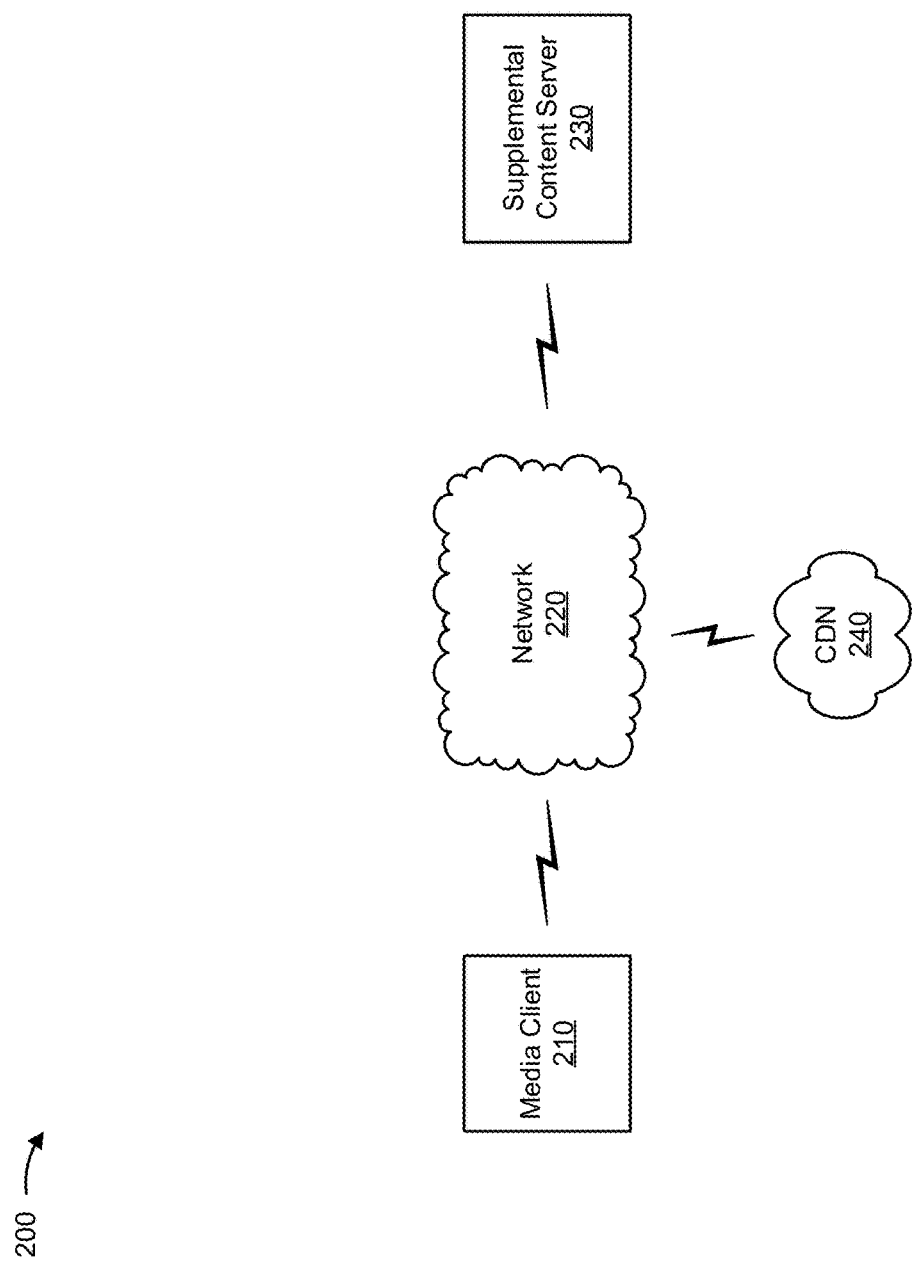
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a media client 210, a network 220, a supplemental content server 230, and CDN 240. Devices and/or networks of environment 200 can interconnect via wired connections, wireless connections, or a combination of wired and wireless connections.

Media client 210 includes a device capable of receiving, transmitting, and/or processing multimedia content and providing the multimedia content to a user (e.g., via a display device). Examples of media client 210 can include a smartphone, a set-top box, a casting stick (e.g., a high-definition media interface (HDMI) dongle), a computer, a tablet, a cable card, a gaming device, a portable electronic device, and/or other types of devices capable of receiving, transmitting, and/or processing multimedia content and providing the multimedia content to a user.

Network 220 includes one or more wired and/or wireless networks. For example, network 220 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Supplemental content server 230 includes one or more devices capable of storing, processing, and/or routing information associated with supplemental content. In some implementations, supplemental content server 230 can include a communication interface that allows supplemental content server 230 to receive information from and/or transmit information to other devices in environment 200. For example, supplemental content server 230 can receive requests via network for supplemental content information (e.g., from media client 210) and/or can provide supplemental content information and/or supplemental content via network 220 (e.g., to media client 210).

CDN 240 includes one or more server devices (e.g., content servers) or one or more groups of server devices within one or more wired and/or wireless networks. For example, CDN 240 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 240 can provide program content to media client 210.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
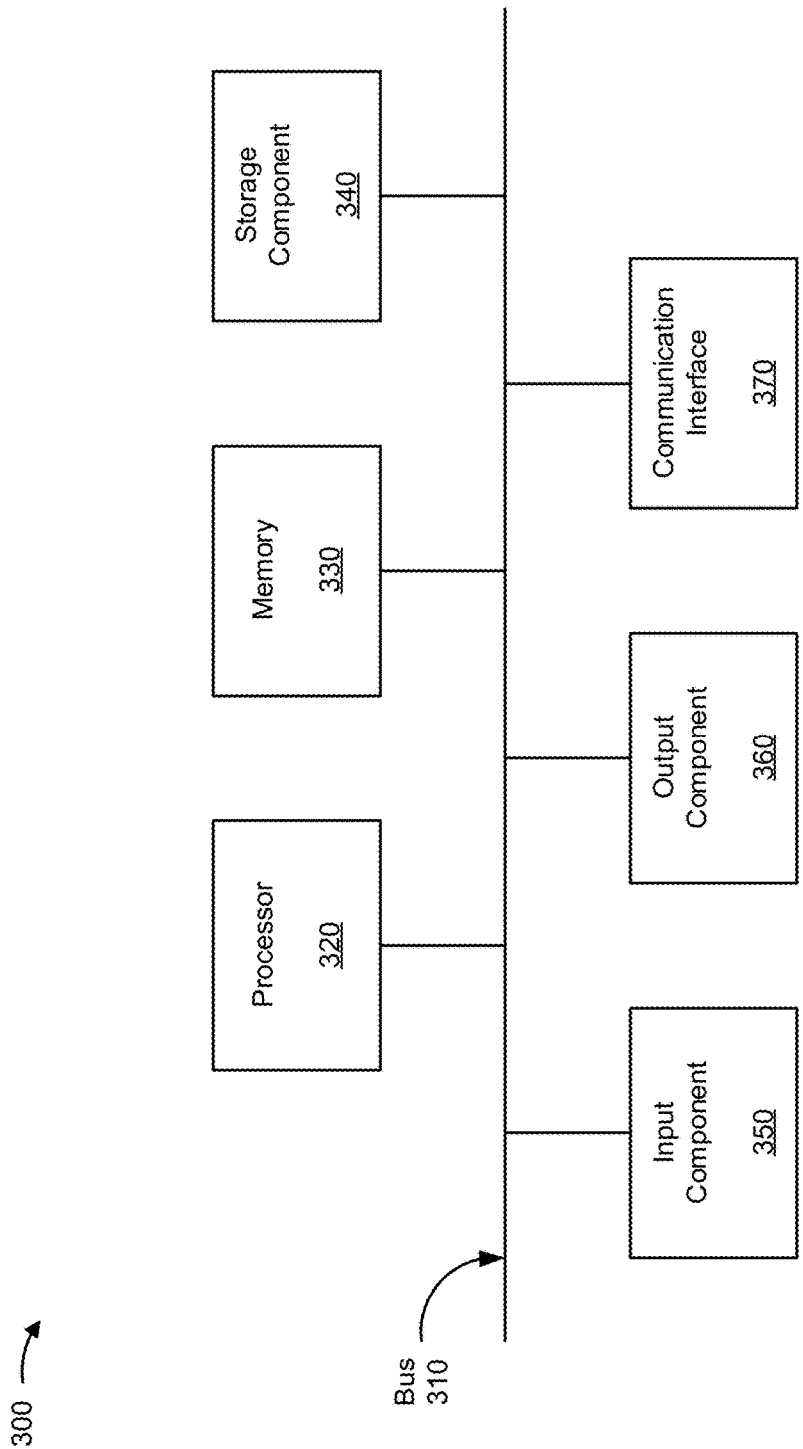
FIG. 3 is a diagram of example components of one or more devices of FIG. 2.

FIG. 3 is a diagram of example components of a device 300. Device 300 can correspond media client 210, and/or supplemental content server 230. In some implementations, media client 210, supplemental content server 230, and/or CDN 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
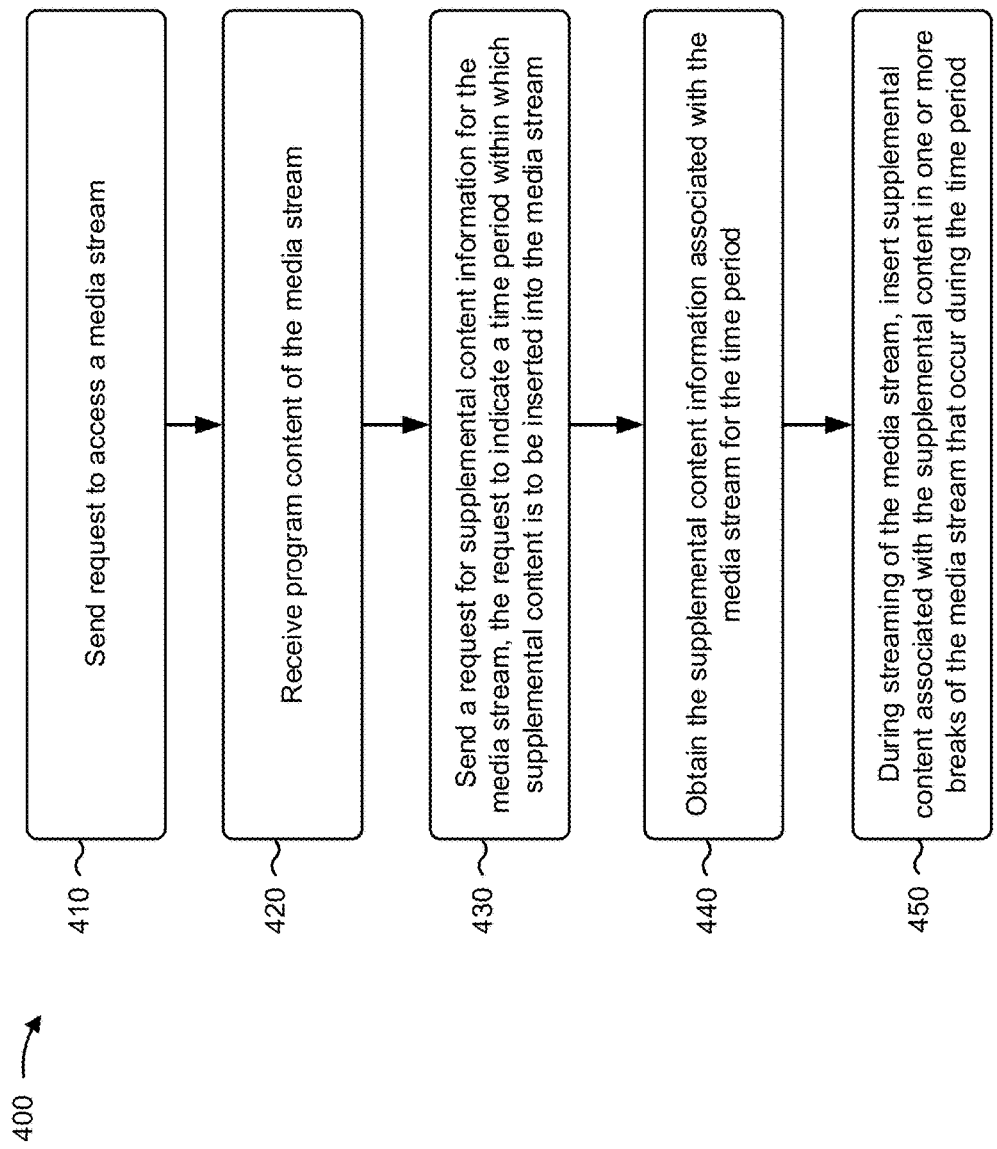
FIG. 4 is a flow chart of an example process for pre-fetching supplemental content for a media stream.

FIG. 4 is a flow chart of an example process 400 for pre-fetching supplemental content for a media stream. In some implementations, one or more process blocks of FIG. 4 can be performed by media client 210. In some implementations, one or more process blocks of FIG. 4 can be performed by another device or a group of devices separate from or including media client 210, such as supplemental content server 230 and CDN 240.

As shown in FIG. 4, process 400 can include sending a request to access a media stream (block 410). For example, media client 210 can request CDN 240 to provide, transmit, and/or stream a media stream. In some implementations, media client 210 can request to access a media stream based on a user input (e.g., via a user interface), receiving instructions or a request from another device in communication with media client 210, and/or the like.

In some implementations, the request to access a media stream can include a message or notification indicating that media client 210 seeks to access (e.g., receive, process, stream, cause to be displayed, and/or the like) the media stream. In some implementations, the request can include one or more characteristics of media client 210 (e.g., subscription information associated with a media service provider associated with CDN 240), an identifier (e.g., a stream identifier, a channel number, a media network identifier, a program identifier, and/or the like), a time of the request, and/or the like.

In some implementations, the media stream can include a continuous set of data that includes content (e.g., media content) accessible via media client 210. In some implementations, the content can include video, audio, text, an image, and/or the like. In some implementations, the content can include live content (e.g., live video, provided in real-time or near real-time), look-up content (e.g., catch-up content, stored content, and/or the like), on demand content, and/or the like. In some implementations, the content can include one or more packets. In some implementations, a packet (e.g., of the one or more packets) can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 220, supplemental content server 230, and/or CDN 240. In some implementations, at least a portion of the content can include a segment, a chunk, and/or the like.

In various implementations, media client 210 can send the request to CDN 240 using any suitable techniques or protocols. For example, media client 210 can request to access the media stream via a communication link (e.g., established via network 220) that can be used to access and/or receive the media stream. As such, media client 210, when sending the request, can send and/or receive one or more communications (e.g., according to suitable techniques or protocols) to establish the communication link to request access to the media stream.

In this way, media client 210 can send a request to access a media stream to permit media client 210 to receive program content of the media stream.

As further shown in FIG. 4, process 400 can include receiving program content of the media stream (block 420). For example, media client 210 can receive the program content from CDN 240 (e.g., via the media stream). In some implementations, media client 210 can receive the program content of the media stream based on sending the request to access the media stream, based on CDN 240 providing the media stream, and/or the like.

As used herein, content can be program content or supplemental content. As used herein, program content can include content produced by a media company, a media network, a media broadcast company, and/or the like. For example, program content can include video, audio, text, an image, and/or the like for a television program, a movie, a televised sporting event, a newscast, a podcast, a niche streaming, a hosted or shared video/audio file, an event cinema, a livecast, a video game, and/or the like. Supplemental content can include metadata, display content associated with the media stream, advertising content (or ad content), and/or the like. As such, supplemental content can be produced or associated with an advertisement agency, media company, media network, media broadcast company, and/or the like for the purpose of advertising a brand, a product, program content, and/or the like. For example, supplemental content can include video, audio, text, an image, and/or the like for a commercial, a preview, a banner advertisement, a public service announcement, an endorsement, an advertorial, and/or the like.

In some implementations, media client 210 can receive the program content via a communication link (e.g., established via network 220). According to some implementations, media client 210 can receive the program content from CDN 240 via a unicast transmission, a multicast transmission, a look-up transmission, and/or the like.

In this way, media client 210 can receive program content of the media stream to permit media client 210 to send a request for supplemental content information for the media stream, the request to indicate a time period during which supplemental content is to be inserted into the media stream.

As further shown in FIG. 4, process 400 can include sending a request for supplemental content information for the media stream, to a supplemental content server, where the request is to indicate a time period within which supplemental content is to be inserted into the media stream (block 430). For example, media client 210 can send the request for the supplemental content information for the media stream to supplemental content server 230. In some implementations, media client 210 can send the request for supplemental content information based on sending the request to access a media stream and/or receiving program content of the media stream.

In some implementations, a break can include a section or chunk of the media stream that is designated for supplemental content. For example, the break can be between sections of program content. In some implementations, the break can occur at the beginning or end of a program time slot. For example, a program time slot can be a time period during which a program is scheduled to be streamed (e.g., via a unicast or multicast stream). In some implementations, a program can be scheduled to be streamed during a program time slot that is based on a time of a request for the stream.

In some implementations, the time period within which supplemental content is to be inserted can include a period of time associated with the request. In such cases, the time period can correspond to a section of the media stream within which the supplemental content is to be inserted. In this case, supplemental content server 230 is to provide all supplemental content information for breaks that are to occur during that time period. In various implementations, the time period can be based on a request, can be based on a time of request, can correspond to a program time slot, and/or the like.

In some implementations, a request for supplemental content information can include a message or notification indicating that media client 210 seeks to access (e.g., receive, view, process, stream, and/or the like) the media stream. In some implementations, the request can include characteristics of media client 210 (e.g., subscription information associated with a media service provider associated with CDN 240, location information), an identifier (e.g., a stream identifier, a channel number, a media network identifier, a program identifier, and/or the like), a time of the request, a time period, and/or the like.

In some implementations, media client 210 can generate the request for supplemental content information based on information associated with the media stream and/or program content of the media stream. For example, media client 210 can determine or identify a program time slot for the program content, and generate the request for supplemental content information based on the program time slot.

As used herein, supplemental content information can include information associated with supplemental content (e.g., identification information, supplemental content source information, sequence information for a sequence of sets of supplemental content in the break, and/or the like) and/or data of the supplemental content, itself. In some implementations, the supplemental content information can indicate supplemental content that is to be inserted into the breaks in the media stream (e.g., breaks between program content). In some implementations, the supplemental content information associated with advertisements (or "ads") that are to be included within the break. For example, the supplemental content information can include video multiple advertisement playlist (VMAP) information and video advertisement serving template (VAST) information. For example, the VMAP information can indicate information associated with each break and the VAST information can indicate information associated with one or more ads of each break. Accordingly, the supplemental content information can include supplemental content data and/or instructions for obtaining (e.g., downloading) supplemental content data.

In some implementations, media client 210 can send the request based on accessing a media stream. For example, media client 210 can send the request as soon as the media stream is accessed. In some implementations, media client 210 can send the request based on receiving the media stream for a threshold period of time or after a threshold period of time. For example, media client 210 can send the request after 5 seconds, 30 seconds, 1 minute, and/or the like.

In some implementations, media client 210 can send the request according to a schedule. For example, media client 210 can send the request according to a schedule specific to media client 210, a randomly generated schedule, and/or the like. In some implementations, the schedule can be configured in associated with supplemental content server 230 (e.g., supplemental content server 230 can provide the schedule for media client 210 (and/or other media clients in communication with supplemental content server 230). Additionally, or alternatively, media client 210 can randomly generate (e.g., using a random number generator) a schedule to send the request for supplemental content information.

In various implementations, sending the request can be configured according to settings, standards, and/or the like associated with media client 210. For example, a particular media client 210 may be configured to request supplemental content at different times or in a different manner from supplemental content server 230 than another media client 210 that is in communication with supplemental content server 230. Additionally, or alternatively, particular settings may be adjustable and/or tuned (e.g., based on user input, based on a schedule, and/or the like). For example, a user, via user a user interface of media client 210, may adjust settings for requesting supplemental content information from supplemental content server 230. Additionally, or alternatively, media client 210 may adjust settings for requesting supplemental content information from supplemental content server 230 based on a time of the day, a time of the week, a time of the month, and/or the like. In some implementations, a set of media clients in communication with supplemental content server 230, including media client 210, may be scheduled to request supplemental content information at different times to ensure that supplemental content server 230 does not become overloaded (e.g., does not receive a threshold amount of requests) during a particular time period. Accordingly, media client 210 may use any combination of scheduling and/or timing to request supplemental content information from supplemental content server 230.

In some implementations, media client 210 can request supplemental content breaks for an upcoming time period once a time period corresponding to a previous request for supplemental content expires or is about to expire (e.g., within 1 minute of expiration, within 30 seconds of expiration, and/or the like). In this case, media client 210 can monitor the media stream to detect that an end of a program time slot and/or a time period associated with the request is approaching. For example, media client 210 can monitor the media stream to detect that the program time slot is ending in 5 minutes and/or media client 210 can monitor the media stream to detect that a time period associated with the request is ending in 5 minutes. In such cases, media client 210 can send another request for supplemental content information to obtain supplemental content information for a subsequent time period. In some implementations, media client 210 can request the supplemental content for a time period that is based on when media client 210 began streaming the media stream. For example, media client 210, can request supplemental content information as soon as media client 210 gains access to the media stream, and then can request supplemental content information for subsequent time periods every 30 minutes. In such cases, the time period within which the supplemental content is to be inserted can be 30 minutes (i.e., the time periods for requesting the supplemental content and receiving supplemental content information can correspond to one another).

In some instances, media client 210 is to insert supplemental content within a break of the media stream based on a local zone and/or region associated with media client 210. According to some implementations, based on the request for the supplemental content information, supplemental content server 230 identifies designated or allocated supplemental content breaks, for the media stream, for the local zone or region of media client 210. The supplemental content breaks are representative of supplemental content to be included within the breaks of the media stream. The supplemental content breaks can include content slots that are to include sets of supplemental content (e.g., that may correspond to ads) that are to be included within the breaks of the time period of the request. For example, the supplemental content breaks can include supplemental content that is based on a local zone and/or region associated with media client 210 (e.g., a local zone or region from where media client 210 sent the request, a local zone and/or a region designated as a home region of media client 210 (e.g., which can be based on a residence of a user associated with media client 210)). An example region can include one or more of a city, a metropolitan area, a county, a state, a country, or any other geographical region within which media client 210 is located. Furthermore, a region can include one or more local zones.

Accordingly, upon receipt of a request for supplemental content information, supplemental content server 230 can determine the local zone and/or region corresponding to a location of media client 210 (which can be provided in the request). Supplemental content server 230 can then identify one or more supplemental content breaks (for the requested time period) corresponding to the local zone and/or region and generate supplemental content information corresponding to the supplemental content breaks. As such, the supplemental content information can include local zone supplemental content information corresponding to the local zone and/or regional supplemental content information corresponding to the region of media client 210. In some implementations, when supplemental content server 230 provides both local zone supplemental content information and regional supplemental content information for content slot of a supplemental content break, media client 210 can insert local zone supplemental content (e.g., by default) for the supplemental content slot. Additionally, or alternatively, if local zone supplemental content information is not provided for an content slot of an supplemental content break and regional supplemental content is provided for the same content slot of the supplemental content break, media client 210 can insert regional supplemental content for the content slot (i.e., local zone supplemental content is to be inserted over regional supplemental content if the local zone supplemental content is provided). Accordingly, supplemental content server 230, can provide the appropriate supplemental content information to media client based on location information received from media client 210.

As described herein, according to some implementations, a request for supplemental content information for a break can be sent prior to media client 210 detecting or receiving a cueing message for an upcoming break of a media stream. In other words, media client 210 can pre-fetch the supplemental content information (and/or supplemental content) a media stream by requesting supplemental content information for remaining breaks of a particular time period (e.g., a time period corresponding to a current program time slot of the media stream or a future program time slot of the media stream). As such, media client 210 can pre-fetch the supplemental content information.

Media client 210 can send the request to supplemental content server 230 using any suitable techniques or protocols. In some implementations, media client 210 can request supplemental content information via a communication link (e.g., established via network 220) that can be used to receive the supplemental content information and/or the supplemental content. In such implementations, media client 210, when sending the request, can send and/or receive one or more communications (e.g., according to suitable techniques or protocols) to establish the communication link to request access to the media stream.

In this way, media client 210 can send a request for supplemental content information for the media stream to permit media client 210 to obtain and/or insert the supplemental content information associated with the media stream for the time period.

As further shown in FIG. 4, process 400 can include obtaining the supplemental content information associated with the media stream for the time period (block 440). For example, media client 210 can obtain the supplemental content information from supplemental content server 230. In some implementations, media client 210 can obtain the supplemental content information based on sending the request for supplemental content information for the media stream.

In some implementations, media client 210 can obtain the supplemental content information from supplemental content server 230 via a communication link (e.g., via network 220) that can be used to access and/or receive the supplemental content information. As such, supplemental content server 230, when sending the supplemental content information, can send and/or receive one or more communications (e.g., according to suitable techniques or protocols) to establish the communication link to provide the supplemental content information to media client 210.

In some implementations, media client 210 analyzes the supplemental content information to determine how supplemental content is to be inserted within the media stream. For example, media client 210 can determine that the supplemental content information includes instructions for inserting supplemental content within a break of the media stream. Such instructions can include instructions regarding a sequence for inserting supplemental content in appropriate supplemental content breaks (e.g., via VMAP information), a sequence for inserting supplemental content within a particular supplemental content break (e.g., via VAST information), instructions for timing of inserting supplemental content, instructions for obtaining (e.g., downloading) the supplemental content, instructions for accessing a stream (e.g., am multicast stream) including the supplemental content, and/or the like. As mentioned above, supplemental content information can include supplemental content data, and therefore, when media client 210 obtains the supplemental content information, media client 210 can obtain supplemental content, itself.

In this way, media client 210 can obtain the supplemental content information associated with the media stream for the time period, to permit media client 210 to insert, during streaming of the media stream, supplemental content associated with the supplemental content information in one or more breaks of the time period of the media stream.

As further shown in FIG. 4, process 400 can include, during streaming of the media stream, inserting supplemental content associated with the supplemental content information in one or more breaks of the media stream that occur during the time period (block 450). For example, media client 210 can insert the supplemental content associated with the supplemental content information. In some implementations, media client 210 can insert the supplemental content based on obtaining the supplemental content information associated with the media stream for the time period.

In some implementations, media client 210 can insert supplemental content within breaks of the media stream. For example, while media client 210 accesses the media stream (or as media client 210 receives, processes, and/or causes display of content of the media stream), media client 210 can monitor for a cueing message (e.g., an SCTE 35 message) in the media stream. Based on detecting the cueing message, media client 210 can insert the supplemental content (which has already been obtained), when the cueing message is detected, according to the supplemental content information.

In some implementations, media client 210 can insert supplemental content according to the supplemental content information. In some implementations, media client 210 can insert supplemental content based on the type of the media stream. For example, for a unicast media stream and/or an on-demand media stream, media client 210 can obtain the supplemental content (e.g., from supplemental content server 230 and/or a different supplemental content source) by downloading the supplemental content before the break in the media stream, and inserting the supplemental content within the break. As another example, for a multicast media stream, media client 210 can switch from a program content media stream to a supplemental content media stream. In such cases, the program content media stream and the supplemental content media stream can be multicast from a multicast repeater, and media client 210 can switch between streams according to the supplemental content information obtained from supplemental content server 230. In some implementations, media client 210 can insert supplemental content according to VMAP information and/or VAST information.

In some implementations, media client 210 can insert local supplemental content in one or more breaks of the media stream. Additionally, or alternatively, media client 210 can insert regional supplemental content in one or more breaks of the media stream. In some implementations, media client 210 can insert local supplemental content in one or more breaks of the media stream when local supplemental content is included in the supplemental content information, and can insert regional supplemental content (e.g., of a same or similar duration) in the one or more breaks when local supplemental content is not included in the supplemental content information. Additionally, or alternatively, media client 210 can insert local supplemental content and/or regional supplemental content in one or more breaks based on one or more factors and/or rules (e.g., associated with time of day, market, channel, and/or the like).

In this way, media client 210 can insert, during streaming of the media stream, supplemental content associated with the supplemental content information in breaks of the time period of the media stream.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
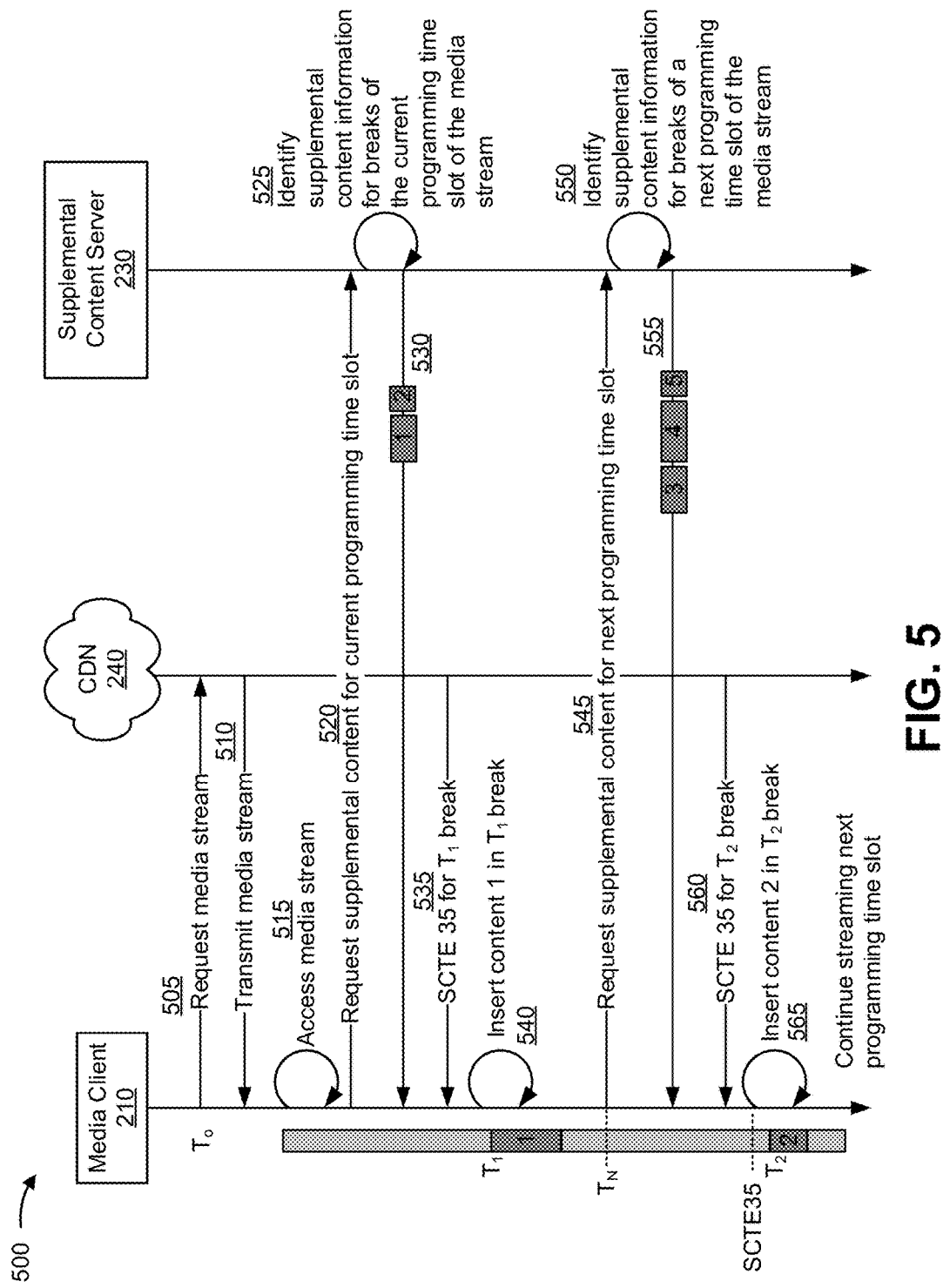
FIG. 5 is a diagram of an example implementation relating to the example process shown in FIG. 4.

FIG. 5 is a call flow diagram of an example call flow 500 for pre-fetching supplemental content for a media stream. As shown, FIG. 5 shows an example of communications between media client 210, supplemental content server 230, and CDN 240.

As shown in FIG. 5, and by reference number 505, media client 210, at time $T_0$, requests a media stream from CDN 240. As shown by reference number 510, CDN 240 replies by transmitting the media stream to media client 210. As shown by reference number 515, media client 210 accesses (e.g., receives, processes, and/or causes display of) the media stream. As shown by reference number 520, media client 210 requests supplemental content, for a current program time slot of the media stream, from supplemental content server 230. As shown by reference number 525, supplemental content server 230 identifies supplemental content information for breaks of the current programming time slot. As shown by reference number 530, supplemental content server 230 provides supplemental content information associated with supplemental content (e.g., associated with supplemental content 1 and supplemental content 2) to media client 210. As shown by reference number 535, CDN 240 transmits an SCTE 35 message to media client 210 for a break in the current program time slot associated with time $T_1$. In some implementations, the SCTE 35 message can be included within the media stream. As shown by reference number 540, media client 210 inserts supplemental content 1 in the $T_1$ break (i.e., the break time at time $T_1$).

As further shown in FIG. 5, and by reference number 545, at time $T_N$, media client 210 requests supplemental content for a next scheduled program time slot (e.g., following the current program time slot) from supplemental content server 230. For example, $T_N$ can correspond to a threshold amount of time before the end of a time period of the previous request (e.g., the time period corresponding to the current program time slot). As such, at time $T_N$, media client 210 can pre-fetch supplemental content for a future time period (i.e., a time period corresponding to a next program time slot). As shown by reference number 550, supplemental content server 230 identifies supplemental content information for breaks of the next programming time slot of the media stream. As shown by reference number 555, supplemental content server 230 provides supplemental content information associated with supplemental content (e.g., associated with supplemental content 3, supplemental content 4, and supplemental content 5) to media client 210. As shown by reference number 560, CDN 240 transmits an SCTE 35 message to media client 210 for a break in the next scheduled program time slot associated with time $T_2$. As shown by reference number 565, media client 210 inserts supplemental content 2 in the $T_2$ break (i.e., the break at time $T_2$). Thereafter media client 210 continues streaming the next scheduled program time slot.

As indicated above, FIG. 5 is provided merely as an example. Other examples are possible and can differ from what was described with regard to FIG. 5.

According to some implementation described herein, a supplemental content delivery system enables media client 210 to obtain supplemental content for a particular time period of a media stream before receiving cueing messages of the media stream. For example, when accessing a media stream, media client 210 can request supplemental content for a time slot corresponding to a scheduled time of a program based on accessing the media stream, based on receiving program content (corresponding to the program) of the media stream, based on receiving the media stream for a threshold period of time, according to a schedule (which can include a randomly generated schedule), and/or the like. In some implementations, media client 210 can request supplemental content breaks for an upcoming time period once the time period corresponding to a previous request for supplemental content is about to expire. In some implementations, media client 210 can request the supplemental content for a time period that is based on when the media client began streaming the media stream.

In this way, because the requests for supplemental content can be based on characteristics of media client 210, based on timing of streaming the media stream, and/or based on random factors, media client 210 can request supplemental content from a supplemental content server at different times than many (e.g., thousands or millions of) other media clients, rather at the same time as the many other media clients. In other words, some implementations described herein provide for supplemental content to be proactively requested (e.g., once the media stream is being streamed) rather than reactively requested (e.g., once a break in the media stream is detected) as performed in prior techniques. As such, some implementations described herein enable the load on the supplemental content server to be balanced across a longer time period than a relatively short time period that falls just before a break in the media stream as performed in previous techniques. Therefore, some implementations described herein can prevent media streaming errors or failures resulting in improper supplemental content streaming, dropping the media stream, extended buffering, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
send a first request to access a media stream from a content delivery network;
receive program content of the media stream from the content delivery network;
generate a random schedule for requesting supplemental content information,
the supplemental content information being associated with:
first supplemental content associated with a first break associated with the media stream, and
second supplemental content associated with a second break associated with the media stream, and
the random schedule specifying:
a randomly generated first point in time for requesting the first supplemental content and the second supplemental content, and
a randomly generated second point in time for requesting third supplemental content,
the randomly generated second point in time being during a period of time, in the media stream, after the first break and before the second break;
send a second request, for the supplemental content information, to a supplemental content server based on the randomly generated first point in time,
where the supplemental content information is associated with an upcoming time period of the media stream, and
where the second request includes information identifying the upcoming time period,
the upcoming time period including:
a first time associated with the first break, in the media stream, during which the first supplemental content is to be inserted into the media stream,
the period of time, in the media stream and after the first break and before the second break, during which no supplemental content is to be inserted into the media stream, and
a second time associated with the second break, in the media stream and after the period of time, during which the second supplemental content is to be inserted into the media stream;
obtain, prior to the upcoming time period and based on the second request, the supplemental content information associated with the media stream for the upcoming time period; and
during streaming of the media stream,
insert the first supplemental content during the first break of the media stream, and
insert the second supplemental content during the second break of the media stream.

2. The device of claim 1, where the upcoming time period corresponds to a current program time slot of the media stream.

3. The device of claim 1, where the upcoming time period corresponds to a current program time slot of the media stream and a next program time slot of the media stream.

4. The device of claim 1, where the one or more processors, when obtaining the supplemental content information, are to:
obtain the supplemental content information before detecting one or more cueing messages corresponding to the first break and the second break in the media stream.

5. A non-transitory computer-readable medium storing instructions, the instructions comprising:
one or more instructions that, when executed by one or more processors, cause the one or more processors to:
send a first request to access a media stream from a content delivery network;
receive program content of the media stream from the content delivery network;
generate a random schedule for requesting supplemental content information,
the supplemental content information being associated with:
first supplemental content associated with a first break associated with the media stream, and
second supplemental content associated with a second break associated with the media stream, and
the random schedule specifying:
a randomly generated first point in time for requesting the first supplemental content and the second supplemental content, and
a randomly generated second point in time for requesting third supplemental content,
the randomly generated second point in time being during a period of time, in the media stream, after the first break and before the second break;
send a second request, for the supplemental content information, to a supplemental content server based on the randomly generated first point in time,
where the supplemental content information is associated with an upcoming time period of the media stream, and
where the second request includes information identifying the upcoming time period,
the upcoming time period including:
a first time associated with the first break, in the media stream, during which the first supplemental content is to be inserted into the media stream,
the period of time, in the media stream and after the first break and before the second break, during which no supplemental content is to be inserted into the media stream, and
a second time associated with the second break, in the media stream and after the period of time, during which the second supplemental content is to be inserted into the media stream;
obtain, prior to the upcoming time period and based on the second request, the supplemental content information associated with the media stream for the upcoming time period; and during streaming of the media stream,
insert the first supplemental content during the first break of the media stream, and
insert the second supplemental content during the second break of the media stream.

6. The non-transitory computer-readable medium of claim 5, where the upcoming time period corresponds to a current program time slot of the media stream.

7. The non-transitory computer-readable medium of claim 5, where the upcoming time period corresponds to a current program time slot of the media stream and a next program time slot of the media stream.

8. The non-transitory computer-readable medium of claim 5, where the one or more instructions, that cause the one or more processors to obtain the supplemental content information, cause the one or more processors to:
obtain the supplemental content information before detecting one or more cueing messages corresponding to the first break and the second break in the media stream.

9. A method, comprising:
sending, by a device, a first request to access a media stream from a content delivery network;
receiving, by the device, program content of the media stream from the content delivery network;
generating, by the device, a random schedule for requesting supplemental content information,
the supplemental content information being associated with:
first supplemental content associated with a first break associated with the media stream, and
second supplemental content associated with a second break associated with the media stream, and
the random schedule specifying:
a randomly generated first point in time for requesting the first supplemental content and the second supplemental content, and
a randomly generated second point in time for requesting third supplemental content,
the randomly generated second point in time being during a period of time, in the media stream, after the first break and before the second break;
sending, by the device, a second request, for the supplemental content information, to a supplemental content server based on the randomly generated first point in time,
where the supplemental content information is associated with an upcoming time period of the media stream, and
where the second request includes information identifying the upcoming time period,
the upcoming time period including:
a first time associated with the first break, in the media stream, during which the first supplemental content is to be inserted into the media stream,
the period of time, in the media stream and after the first break and before the second break, during which no supplemental content is to be inserted into the media stream, and
a second time associated with the second break, in the media stream and after the period of time, during which the second supplemental content is to be inserted into the media stream;
obtaining, by the device, prior to the upcoming time period and based on the second request, the supplemental content information associated with the media stream for the upcoming time period; and
during streaming of the media stream,
inserting, by the device, the first supplemental content during the first break of the media stream, and
inserting, by the device, the second supplemental content during the second break of the media stream.

10. The method of claim 9, where the upcoming time period corresponds to a current program time slot of the media stream.

11. The method of claim 9, where the upcoming time period corresponds to a current program time slot of the media stream and a next program time slot of the media stream.

12. The method of claim 9, where obtaining the supplemental content information comprises:
obtaining the supplemental content information before detecting one or more cueing messages corresponding to the first break and the second break in the media stream.

13. The device of claim 1, where the randomly generated second point in time is based on the randomly generated first point in time.

14. The non-transitory computer-readable medium of claim 5, where the randomly generated second point in time is based on the randomly generated first point in time.

15. The method of claim 9, where the randomly generated second point in time is based on the randomly generated first point in time.

16. The device of claim 1, where the one or more processors are further to:
send a third request, for the third supplemental content, to the supplemental content server based on the randomly generated second point in time.

17. The device of claim 1, where the third supplemental content is associated with a third break associated with the media stream.

18. The non-transitory computer-readable medium of claim 5, where the one or more instructions, when executed by one or more processors, further cause the one or more processors to:
send a third request, for the third supplemental content, to the supplemental content server based on the randomly generated second point in time.

19. The non-transitory computer-readable medium of claim 5, where the third supplemental content is associated with a third break associated with the media stream.

20. The method of claim 9, further comprising:
sending a third request, for the third supplemental content, to the supplemental content server based on the randomly generated second point in time.

* * * * *